(12) United States Patent
Koster

(10) Patent No.: US 9,825,938 B2
(45) Date of Patent: Nov. 21, 2017

(54) SYSTEM AND METHOD FOR MANAGING CERTIFICATE BASED SECURE NETWORK ACCESS WITH A CERTIFICATE HAVING A BUFFER PERIOD PRIOR TO EXPIRATION

(71) Applicant: Cloudpath Networks, Inc., Westminster, CO (US)

(72) Inventor: Kevin Lee Koster, Westminster, CO (US)

( * ) Notice: Subject to any disclaimer, the term of this patent is extended or adjusted under 35 U.S.C. 154(b) by 156 days.

(21) Appl. No.: 14/882,372

(22) Filed: Oct. 13, 2015

(65) Prior Publication Data

US 2017/0104749 A1    Apr. 13, 2017

(51) Int. Cl.
*H04L 29/06* (2006.01)
*H04L 9/32* (2006.01)

(52) U.S. Cl.
CPC ........ *H04L 63/0823* (2013.01); *H04L 9/3268* (2013.01); *H04L 63/0853* (2013.01); *H04L 63/0876* (2013.01)

(58) Field of Classification Search
CPC ............... H04L 63/0823; H04L 9/3268; H04L 63/0853; H04L 63/0876
See application file for complete search history.

(56) References Cited

U.S. PATENT DOCUMENTS

| 7,249,375 | B2 | 7/2007 | Bhatia et al. |
| 7,353,383 | B2 | 4/2008 | Skingle |
| 7,428,750 | B1 | 9/2008 | Dunn et al. |
| 7,788,493 | B2 | 8/2010 | Mononen et al. |
| 7,913,298 | B2 | 3/2011 | Bhatia et al. |
| 7,953,979 | B2 | 5/2011 | Borneman et al. |
| 8,504,824 | B1 * | 8/2013 | Abbott .................... H04L 67/20 380/44 |
| 9,449,354 | B2 * | 9/2016 | Li .......................... G06F 21/105 |
| 2002/0144119 | A1 | 10/2002 | Benantar |

(Continued)

*Primary Examiner* — Mahfuzur Rahman
(74) *Attorney, Agent, or Firm* — Daniel W. Roberts; Law Offices of Daniel W. Roberts, LLC

(57) ABSTRACT

Provided is a system and method for managing certificate based secure network access based on a buffer period prior to the expiration of the Certificate. The system includes an authentication hardware system structured and arranged to receive from a User by way of a first device having at least one processor, a request for certificate based network access, the request including a Certificate having a lifespan incorporating a buffer period. A validation hardware system having at least one processor and being in communication with the authentication hardware system is structured and arranged to receive a request for validation of the Certificate, the validation hardware system evaluating the Certificate having a lifespan incorporating the buffer period to a current date to provide a positive or negative evaluation of the Certificate. In response to a positive evaluation of the buffer period to the current date, the Certificate is validated and the user is provided certificate based network access. In response to a negative evaluation of the buffer period to the current date, the Certificate is restricted and at least a portion of the Network access is restricted. Under such a restriction, the user may use the restricted Certificate to obtain a new unrestricted Certificate having a new buffer period. An associated method of use is also provided.

66 Claims, 7 Drawing Sheets

(56) References Cited

U.S. PATENT DOCUMENTS

| | | |
|---|---|---|
| 2006/0080352 A1 | 4/2006 | Boubez et al. |
| 2006/0094403 A1 | 5/2006 | Norefors et al. |
| 2007/0043824 A1* | 2/2007 | Fremantle ............... H04L 67/26 709/214 |
| 2008/0072301 A1 | 3/2008 | Chia et al. |
| 2008/0263629 A1 | 10/2008 | Anderson |
| 2009/0037729 A1 | 2/2009 | Smith et al. |
| 2009/0172776 A1 | 7/2009 | Makagon et al. |
| 2009/0271409 A1 | 10/2009 | Gosh |
| 2010/0077208 A1 | 3/2010 | Appiah et al. |
| 2010/0241811 A1* | 9/2010 | Solihin ............... G06F 12/0862 711/137 |
| 2011/0247055 A1 | 10/2011 | Guo et al. |
| 2012/0023568 A1 | 1/2012 | Cha et al. |
| 2012/0072979 A1 | 3/2012 | Cha et al. |
| 2012/0158527 A1* | 6/2012 | Cannelongo ........... G06Q 30/02 705/14.73 |
| 2013/0103833 A1 | 4/2013 | Ringland et al. |
| 2015/0143542 A1* | 5/2015 | Li ......................... G06F 21/105 726/28 |
| 2016/0094546 A1* | 3/2016 | Innes ................. H04L 63/0823 713/156 |

* cited by examiner

FIG. 2

| BUFFER PERIOD DATA | |
|---|---|
| Sara | Cert: AABB |
| Buffer Period: | 9/19/2016 |
| Expiration: | 10/19/2016 |
| System: | Any |
| Note: | Last Request - 9/10/15 |
| | |
| Kevin | Cert: BBCC |
| Buffer Period: | 9/5/2015 |
| Expiration: | 10/5/2015 |
| System: | Tablet1 |
| Note: | Buffer Embedded |
| | |
| Willa | Cert: DDEE |
| Buffer Period: | 9/2/2015 |
| Expiration: | 12/2/2015 |
| System: | Any |
| Note: | |
| | |
| ..... | .... |
| Olaf | Cert: EEFF |
| Buffer Period: | 9/3/2015 |
| Expiration: | 10/3/2015 |
| System: | Mac: 00:3e:e1:c2:2d:f5 |
| Note: | |

SYSTEM AND METHOD FOR MANAGING CERTIFICATE BASED SECURE NETWORK ACCESS WITH A CERTIFICATE HAVING A BUFFER PERIOD PRIOR TO EXPIRATION

FIELD OF THE INVENTION

The present invention relates generally to systems and methods for establishing authentication of Users of computer networks, and more specifically to systems and methods for managing Certificate based secure network access with a Certificate having a buffer period prior to the expiration of the Certificate, the Certificates identifying the Users and also controlling, at least in part, the scope of network access afforded to the User. Moreover the buffer period is used to validate or invalidate the access request and trigger provisioning a new Certificate before the current certificate expires.

BACKGROUND

In the physical world, individual persons are able to assess one another by sight, hearing and an accounting of physical attributes. Drivers' licenses, passports and other regulated documents provide verified accountings of attributes that permit individuals to validate who they are, or for others to validate who an individual says he or she is.

Fingerprints, retinal pattern, breath and DNA among other attributes are understood and recognized to be highly individualistic and are widely accepted and used to verify identity. But these attributes are physical and tied to a physical world.

Computers have become commonplace and highly integrated in nearly all aspects of modern life—transcending the bounds of professional and social spaces, computers are a prominent fixture in the workplace, in the home, as mobile devices and in many other places and arenas of daily life and modern existence.

Increasingly individuals are representing themselves in the cyber world of computer systems and computer networks, where digital information in the elemental form of binary data is entirely ignorant of physicality. A critical problem in cyberspace is knowing with whom you are dealing—in short, at the present time there is no precise way to determine the identity of a person in digital space. Friends, families, colleagues may use a common computer, share passwords, or even pretend to be people they are not. Sometimes these actions are benign—sometimes they are not.

Traditionally, different systems establish individualized, but similar signup and login procedures to collect information directly from users to establish user identities, passwords and other information in the effort to establish at least a notion of an identity for a user.

A typical person over the age of ten in a modern household with access to computer resources may have a number of user accounts, each with a user name and password as well as perhaps additional security measures such as pin numbers, security images, test questions, and the like.

But the redundancy of such systems, especially where use of a system is occasional or only desired for a brief interaction leads to many problems. Users struggling to remember passwords default to the use of simple phrase, such as "password", "opensaysme", "abcdgoldfish", "0p3n4m3" or other simplistic phrases that are easily compromised. Although advances in data storage have increased dramatically in recent years there are still costs involved in archiving data—and establishing a user account and maintaining the data records for such an account may be costly for a system where the high percentage of users never return.

Indeed, in some cases when a user is faced with forgetting his or her prior login information or being unsure if he or she even has an existing identity, the user may opt to create a new identity rather than try and recover the old identity—an action that further leads to increases in archived data, increased storage requirements, potential maintenance issues, and of course costs in terms of time, energy and money.

As computers are often used in a commercial setting such as a business, organization or secured network (hereinafter "business"), there are often very legitimate desires by that business to know who is accessing their network. In addition, in many instances it is highly desired by a business or organization to not only know who is using their system, but also to control the type of equipment that is used with their system.

Digital certificates, also known as public key certificates, are electronic documents that bind a digital signature (a mathematical schema for demonstrating authenticity) to a key, such as a public key, that is tied to an identity. More simply put, digital certificates are electronic documents that are offered to prove or verify the identity of the user. Typically a digital certificate is issued by a certificate authority (CA) that has performed or established some threshold of information to assert that the party to whom the certificate is issued is indeed the party he or she reports to be.

In addition to identifying a person, a digital certificate may also include additional information, such as the level of authorization that should be afforded to the holder of the certificate, the duration of validity for the certificate, the user's real name, the user's alternative name, the intermediate certificate authority who issued the certificate, or other such information pertinent to establishing both the identity of the user of the digital certificate as well as the veracity of the root certificate authority ultimately responsible for the apparent authority vested in the digital certificate.

Indeed, digital certificates can and often do provide a great deal of simplicity in authenticating a user as the user has clearly established him or herself in some way that is sufficient for a certificate authority to provide the digital certificate. Relying on a digital certificate can ease a network's reliance on parties having previously established or contemporaneously establishing a local identity—a savings both in terms of time for the user and costs associated with the overhead and storage of the user identity for the local network.

However, it is an underlying aspect of a digital certificate that it can only be sent from the user's system if it has not expired. Moreover the ability of the certificate to be used for authentication and or verification is only applicable while the Certificate is still in a non-expired state. Once expired the user cannot use the expired certificate for re-authentication and reissue, and must complete whatever the current policy and procedure process has been established for the particular setting he or she is desiring to have a certificate once again.

It should also be noted that in most cases, a user, requesting access to resources, who is providing a name and password is in essence already connected to the network, and as such there is a potential security risk.

The Open System Interconnection model, also referred to as the Open Source Interconnection model or more simply the OSI model, is a product of the Open System Interconnection effort at the International Organization for Standardization, and more specifically is a prescription of characterizing and standardizing the functions of a communication system in terms of seven abstraction layers of concentric organization—Layer 1 the physical layer, Layer 2 the data link layer, Layer 3 the network layer, Layer 4 the transport layer, Layer 5 the session layer, Layer 6 the presentation layer, and Layer 7 the application layer.

TCP/IP based network communication is established at Layer 3, the network layer. By contrast, when a user is presented with a login screen requesting a User Name and Password, that interaction is occurring at the Application layer 7. Moreover, because the User has actually established connection through the Layers 1-6, there is a possibility that errant code and or configuration of network devices could permit a user to gain unwarranted access to some if not all resources without actually providing a proper username and password.

The use of certificates in proving user identity in and among networked resources is not entirely new. The prior art reference of Appiah US 2010/0077208 teaches an authentication service configured to authenticate User Credentials and generate an authentication certificate based on the User Credentials and the System Identifier FOR subsequent authentication to a Data Center. The prior art reference of Borneman U.S. Pat. No. 7,953,979 teaches a system and method to establish trust so that a trusted third party may then provide Signed Certificates to verify Trust, i.e. the Master System is delegating authority.

The prior art reference of Guo US 2010/0247055 is teaching device specific authentication for website access (Layer 7)—a user with a device known to an account authority service can obtain a security token via a communications network to present to another entity via a communications network as proof of identity. The prior art reference of Liu US 2010/0154046 is teaching a single sign-on methodology across web sites and services (Layer 7). The prior art reference of Norefors US 2006/0094403 teaches a method of obtaining network service by using a phone having existing telecommunications service and a PC connecting to a Web Server (Layer 7) which directs a One Time Password to be sent via Short Message Service, also known as SMS, to the user's phone read by the user and provided back to the Web Server via the PC (Layer 7).

Still further, the prior art reference of Benantar US 2002/0146119, teaches a User obtaining a digital certificate from a Certificate Authority and the public and private certificates being loaded to a keystore of a Single Sign On system. The Single Sign On system uses the digital certificate to gate access to legacy applications (Layer 7). And of course it is clear that these legacy applications are within the Benantar network.

However, in all of these instances the use of the Certificate for identification or signing purposes is occurring at Layer 7—the Application layer. In all of these references, the underlying network connections have already been established and are being used. Moreover, although the use of a Digital certificate is being taught as a way of potentially increasing user authentication all of these references fall short of any attempt to further safeguard the original network connection. In addition, these references do not speak to methods of simplifying the process of issuing a certificate to a user. While the digital certificate can certainly be used for access to network resources and that is highly desirable, there are underlying security issues that these references fail to address.

Indeed as digital certificates are most commonly used as attestations of trust, i.e., the signing of documents, messages, applications and the like, as well as the verification that another party is who he or she says they are, there is typically a great deal of concern on who should receive a certificate—has the user been properly vetted, what resources should he or she have, how long should the certificate last, where and when can the certificate be used, etc. . . .

While these issues are extremely relevant in some settings—as with the prior art references above—they are not relevant in all settings. Indeed the use of certificates can significantly increase security in accessing secured networks and network resources, but even as this element of increased security is achieved the use of certificates may simplify the overhead of keeping track of who has access to what and when. Further, as a valid certificate in essence asserts the identity of the holder and/or system, this authentication is lost and can't be relied upon once the certificate has expired. The prior art references do not entertain this point at all.

Hence there is a need for a method and system that is capable of overcoming one or more of the above identified challenges.

SUMMARY OF THE INVENTION

Our invention solves the problems of the prior art by providing novel systems and methods for providing network access management based on a Certificate having a buffer period prior to Expiration.

In particular, and by way of example only, according to one embodiment of the present invention, provided is a method of managing Certificate based secure network access based on a Certificate having a buffer period prior to expiration comprising: receiving a request to generate a certificate for a user device, the certificate for certificate based network access on a secured wireless network, distinct from the user device, the certificate to have a desired lifespan; buffering the desired lifespan to provide a buffer period before expiration of the certificate; generating, by a Certificate generation system having a processor, the Certificate for Certificate based network access, the certificate having a lifespan incorporating the buffer period; providing the Certificate to a User Device having a processor, the User Device distinct from the Certificate generation system, receiving by an authentication device, a request for wireless network access upon the secured wireless network from the user device, the request providing the Certificate having the buffer period; evaluating the buffer period of the Certificate to a current date; in response to a positive evaluation of the buffer period to the current date, validating the Certificate provided in the request and permitting certificate based network access to the user device; and in response to a negative evaluation of the buffer period to the current date, restricting the Certificate provided with the request and blocking at least a portion of network access to the user device.

For another embodiment, provided is a system for managing Certificate based secure network access based on a Certificate having a buffer period prior to expiration including: an authentication hardware system structured and arranged to receive from a User by way of a first device having at least one processor, a request for certificate based network access, the request including a Certificate having a lifespan incorporating a buffer period; a validation hardware system having at least one processor and being in communication with the authentication hardware system and structured and arranged to receive a request for validation of the Certificate, the validation hardware system evaluating the Certificate having a lifespan incorporating the buffer period to a current date to provide a positive or negative evaluation of the Certificate; wherein in response to a positive evaluation of the buffer period to the current date, validating the Certificate provided in the request and permitting certificate based network access to the user device and in response to a negative evaluation of the buffer period to the current date, restricting the Certificate provided with the request and blocking at least a portion of network access to the user device.

Further, in yet another embodiment provided is a non-transitory machine-readable medium on which is stored a computer program for managing Certificate based secure network access based on a Certificate having a buffer period prior to expiration provided to a user, the computer program comprising instructions which when executed by a computer system having at least one processor performs the steps of: receiving a request to generate a certificate for a user device, the certificate for certificate based network access on a secured wireless network, distinct from the user device, the certificate to have a desired lifespan; buffering the desired lifespan to provide a buffer period before expiration of the certificate; generating, by a Certificate generation system having a processor, the Certificate for Certificate based network access, the certificate having a lifespan incorporating the buffer period; providing the Certificate to a User Device having a processor, the User Device distinct from the Certificate generation system; receiving by an authentication device, a request for wireless network access upon the secured wireless network from the user device, the request providing the Certificate having the buffer period; evaluating the buffer period of the Certificate to a current date; in response to a positive evaluation of the buffer period to the current date, validating the Certificate provided in the request and permitting certificate based network access to the user device; and in response to a negative evaluation of the buffer period to the current date, restricting the Certificate provided with the request and blocking at least a portion of network access to the user device.

In yet another embodiment, provided is a non-transitory machine-readable medium on which is stored a computer program comprising instructions to adapt a computer system having at least one processor to provide Certificate based secure network access based on a Certificate having a buffer period prior to expiration previously provided to a user comprising: a receiver module operatively associated with an input device for receiving a request for certificate based network access from a user by way of a first device having at least one processor, the request including a Certificate having a lifespan incorporating a buffer period previously provided to the user device by a certificate generation system other than the user device; an evaluation module for evaluating the Certificate having the lifespan incorporating the buffer period to a current date to provide a positive or negative evaluation of the Certificate; in response to a positive evaluation of the buffer period to the current date, validating the Certificate provided in the request and permitting certificate based network access to the user device; and in response to a negative evaluation of the buffer period to the current date, restricting the Certificate provided with the request and blocking at least a portion of network access to the user device.

Still, in yet another embodiment, provided is a method of providing Certificate based secure network access based on a Certificate having a buffer period prior to expiration including: generating, by a Certificate generation system having a processor, a Certificate having an embedded expiration date corresponding to at least a desired lifespan with a buffer period; providing the Certificate to a User Device having a processor, the User Device distinct from the Certificate generation system; receiving by an authentication device, a request for wireless network access upon the secured wireless network from the user device, the request providing the Certificate having the buffer period; evaluating the buffer period of the Certificate to a current date; in response to a positive evaluation of the buffer period to the current date, validating the Certificate provided in the request and permitting certificate based network access to the user device; and in response to a negative evaluation of the buffer period to the current date, restricting the Certificate provided with the request and blocking at least a portion of network access to the user device.

BRIEF DESCRIPTION OF THE DRAWINGS

FIG. 2 illustrates a table of Certificates with buffer periods prior to expiration in accordance with at least one embodiment;

DETAILED DESCRIPTION

Figure 1:
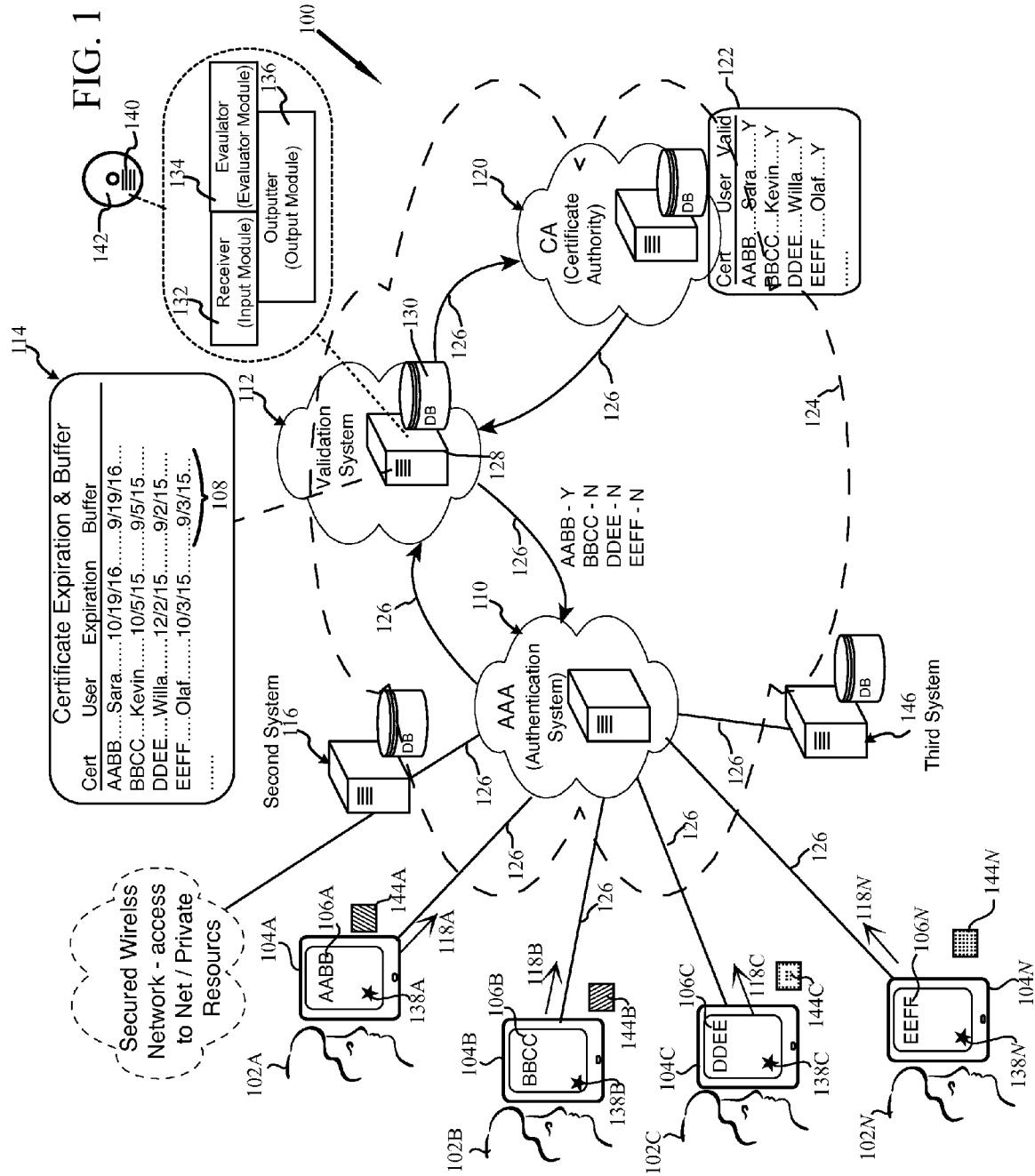
FIG. 1 illustrates a high level diagram of a system for managing certificate based secure network access based on a certificate having a buffer period prior to expiration in accordance with at least one embodiment.

Before proceeding with the detailed description, it is to be appreciated that the present teaching is by way of example only, not by limitation. The concepts herein are not limited to use or application with a specific system or method for managing network access with certificates, and more specifically managing certificate based secure network access by way of a Certificate having a buffer period prior to expiration. Thus although the instrumentalities described herein are for the convenience of explanation shown and described with respect to exemplary embodiments, it will be understood and appreciated that the principles herein may be applied equally in other types of systems and methods involving digital certificates with or without specifically involving managing network access with the use of a Certificate.

This invention is described with respect to preferred embodiments in the following description with reference to the Figures, in which like numbers represent the same or similar elements. Further, with the respect to the numbering of the same or similar elements, it will be appreciated that the leading values identify the Figure in which the element is first identified and described, e.g., element 100 appears in FIG. 1.

Various embodiments presented herein are descriptive of apparatus, systems, articles of manufacturer, or the like for systems and methods involving providing a certificate by way of a browser extension. In some embodiments, an interface, application browser, window or the like may be provided that allows the user of the computing device to direct behavior of the computing device.

Moreover, some portions of the detailed description that follows are presented in terms of the manipulation and processing of data bits within a computer memory. The steps involved with such manipulation are those requiring the manipulation of physical quantities. Generally, though not necessarily, these quantities take the form of electrical or magnetic signals capable of being stored, transferred, combined, compared and otherwise manipulated. Those skilled in the art will appreciate that these signals are commonly referred to as bits, values, element numbers or other clearly identifiable components.

It is of course understood and appreciated that all of these terms are associated with appropriate physical quantities and are merely convenient labels applied to these physical quantifies. Moreover, it is appreciated that throughout the following description, the use of terms such as "processing" or "evaluating" or "receiving" or "outputting" or the like, refer to the action and processor of a computer system or similar electronic computing device that manipulates and transforms data represented as physical (electrical) quantities within the computer system's memories into other data similarly represented as physical quantities within the computer system's memories.

The present invention also relates to apparatus for performing the operations herein described. This apparatus may be specifically constructed for the required purposes as are further described below, or the apparatus may be a general purpose computer selectively adapted or reconfigured by one or more computer programs stored in the computer upon computer readable storage medium suitable for storing electronic instructions.

To further assist in the following description, the following defined terms are provided.

"Certificate Authority"—the entity that issues digital Certificates. Commercial Certificate Authorities often use a combination of techniques including government and private information bureaus, credit card based payment infrastructure, and other measures in an effort to verify and assure that public key contained in the Certificate belongs to the person, organization, server or other entity noted in the Certificate. Moreover, Certificate Authorities not only issue Certificates, but are also used to verify the validity of the holder of the Certificate. Revocation of Certificates is handled by a Certificate Registration List ("CRL") that provides serial numbers of revoked Certificates. Typically, CRL's are provided at defined intervals.

"Authentication System"—The system to which Users connect when requesting access to a secured system or resource, such as an active directory based on the determined validity of a presented Certificate. For at least one embodiment the Authentication System is an Authentication, Authorization and Accounting ("AAA") system such as a RADIUS server.

"Second System/Secured Wireless Network"—the network or application resource to which a User may connect or engage based on the User having an appropriate Certificate.

"Validation System"—the entity that evaluates the Buffer date of the Certificate to determine the validation status of the Certificate. As is set forth below, it is an aspect of the present invention to validate or invalidate a Certificate based on the Buffer date of the Certificate, generally in near real time and without the use of a CRL. For at least one embodiment the Validation System and the Authentication System are one and the same system. As will be further explained below, it is an aspect of the present invention to trap the use of the Certificate during the Buffer period so as to utilize the still valid and unexpired Certificate with a Buffer period to simplify the process of issuing a new Certificate having a new expiration date and a new Buffer period.

"First Device"—the computing device that is used by the person requesting a Certificate. As is further set forth below, it is an aspect of the present invention to validate the device as proper in determining whether or not to provide the requesting person with a Certificate.

"Device Trait"—a physical aspect of the device and/or a software aspect of the device which is an identifiable element of the device, such as, but not limited to, device ID number, device serial number, device type, manufacturer, software version, software ID, an application, digital ID, MAC address, or other similar element. It may also be the presence of or perhaps the absence of a discrete file, and/or the response to a private key or public key challenge. Typically it is provided as a component of the request for the Certificate, directly or as perhaps metadata, but it also may be determined by querying the requesting device.

"User"—typically a person or at the very least a computing device used by a person who is known to the Authentication System, or an administration system that is in communication with the Authentication system in the sense that the he or she has established a User account by providing a threshold of data, e.g. attributes, to identify themselves. Typically it is expected that the Users' interactions with the Authentication System or the related administration system will also serve to establish additional Attributes about themselves.

"Certificate"—also referred to as a digital Certificate, this is a credential that is usable for authentication to the Second System. In at least one embodiment, the Certificate is an X.509 digital Certificate.

"Lifespan"—is the fixed term of viability for a digital Certificate as determined from the date of issue to the date of expiration. Moreover, if the requested Lifespan is for a year (1 Year), from the date of issue, then the expiration date to establish such a Lifespan would typically be exactly one year from the date of issue.

"Buffer"—also referred to as a Buffer Period or Buffer Date, is a pre-set period of time before the established expiration of the Certificate. In varying embodiments, the Buffer may be subtracted from the requested Lifespan of the Certificate, or added to extend beyond the requested Lifespan. The key, as will be further discussed below, is that during the Buffer Period, the Certificate is in fact still valid, but it is treated as if it is at least partially invalid. Moreover, for at least one embodiment during the Buffer Period a User will be redirected to a re-authentication system to request a new Certificate—the process of issuing the new Certificate eased by the existence of the still valid Certificate which may be used to confirm the authentication of the User and or his or her system.

"Certificate Trait"—elements of data that are encoded into or associated with the Certificate. Certificate Trait may include but are not limited to, a root Certificate Authority, intermediate Certificate Authority, time period, common name, subject name, subject's alternative name.

"Secured Network Access"—the fundamental OSI Layer 2-3 connection between the User's computing system and Second System, the network connection established without the need for the User to provide a user name, password, or other element, rather the connection is fundamentally based on the User having an appropriate Certificate. Moreover it is the first communication link between the User's Device and the Second System, and is not a subsequent connection from a device the User's computing system has already connected to at Layer 2-3. In a wireless network setting, the Certificate is automatically provided to the Second System's SSID and the connection is established. Without the Certificate, no secured network access is established with the Second System.

"Secured Application Access"—this is OSI Layer 7 access to an applicant based on the Certificate. Moreover, Secured Application Access is understood and appreciated to be distinct from Secured Network Access.

"Characteristic"—an element of data that is distinct from the Certificate and/or Certificate Trait, such as but not strictly limited to the time, date, IP address, or system hardware address, that may be readily determined from the request for network access made by a User in connection with the presentation of the Users Certificate. Moreover, the Characteristic may be an element that is provided directly by the User and is a part of the submitted request, i.e., the User's IP or MAC address, or it may be an element that is determined by the Authentication System and/or the Validation System, i.e., the time the User's request is received.

With respect to the above defined terms, it is understood and appreciated that for at least one embodiment, each module or system is implemented as a collection of independent electronic circuits packaged as a unit upon a printed circuit board or as a chip attached to a circuit board or other element of a computer so as to provide a basic function within a computer. In varying embodiments, one or more modules may also be implemented as software that adapts a computer to perform a specific task or basic function as part of a greater whole. Further still, in yet other embodiments one or more modules may be provided by a mix of both software and independent electronic circuits.

To briefly summarize, provided is a system and method for managing certificate based secure network access with a Certificate having a Buffer Period prior to expiration. In general a User is provided with a Certificate that he or she will use for access to a secured network access to one or more systems and sources. When a User holding such a Certificate makes a request for network access, the Authentication System receives the Certificate and rather than the traditional approach of determining validity based on a CRL, the Buffer Period is evaluated. More specifically, in response to a positive evaluation of the buffer period to the current date, the Certificate is validated and certificate based network access is permitted. But, in response to a negative evaluation of the buffer period to the current date, the Certificate is restricted and at least a portion of the certificate based network access is restricted. Moreover the decision to accept or deny the Certificate is not based on the actual expiration date, but rather on the Buffer Period occurring just prior to the expiration date. And, as will be discussed below, as the Certificate is in actuality still valid, the Certificate may be used in at least one embodiment to issue the User a new Certificate with a new Lifespan and a new Buffer period, thus simplifying the tasks of network management based on Certificates.

This summary may be more fully appreciated with the respect to the following description and accompanying figures.

Turning now to the drawings, and more specifically, FIG. 1, there is shown a high level diagram of an embodiment of a system for managing certificate based secure network access with a Certificate having a Buffer Period, prior to expiration, e.g., CBP 100, for network access to Users 102 having a First Device 104 and a Certificate 106 having a Buffer Period 108.

CBP 100 also includes at least an Authentication System 110, a Validation System 112 having a Buffer Period record 114, and a Second System 116 to which the Users 102 desire access. As set forth below, in varying embodiments each of these systems may be a separate system within CBP 100, or one or more of these systems may be combined with one another. In addition, as will be further discussed below, for at least one embodiment the Buffer Period 108 is specified within the Certificate 106 itself, such that a separate Buffer Period record 114 may not required for operation of CBP 100, or at least some of the Certificates 106 used within CBP 100.

With respect to each device or system, whether the Users 102 First Device 104, the Authentication System 110, the Validation System 112, the Second System 116, or other device or system as discussed below, each is understood and appreciated to be a computing device including one or more microprocessors, memory, input and output devices, and the like which are adapted by hardware and/or software to permit data exchange over a network, and more specifically browser based data exchange.

With respect to FIG. 1, for the present example, there are shown a plurality of Users 102, of which Users 102A, 102B, 102C, and 102N are exemplary. Each User 102A-102N has a corresponding User Device, hereinafter "UD" or first device 104A-104N, which is understood and appreciated to be a computing device having at least one processor.

Also shown in FIG. 1 is a Second System 116 to which the network access is granted upon validation of the Certificate 106 based on the Buffer Period 108. As suggested by the illustration of FIG. 1, the Authentication System 110 and the Second System 116 may indeed be separate systems. However, it should also be appreciated that the Authentication System 110 and the Second System 116 may both be varying parts of a greater whole—such as a company, business, or other entity that provides the Authentication System 110 as a way to authenticate it's Users 102, and the Second System 116 is the private network to which the authenticated Users 102 are then given network access.

When a User 102 desires to access the Second System 116, he or she makes this request for access to the Authentication System 110, the request 118 including the Certificate 106. As will be further understood below, access to the Second System 116 is dependent upon acceptance of the Certificate 106 with Buffer Period 108. If the Certificate 106 is determined to be invalid, no access to the Second System 116 is provided. For at least one embodiment the Second System 116 is a Secure Certificate based wireless network, such that only Users 102 who have a valid Certificate 106 with Buffer Period 108 which is evaluated positively may enjoy access to this secured wireless network. There are many instances where the Secure Wireless Network Access of the Second System 116 may be the only option for network access, such as, but not limited to a hotel, resort, coffee shop, ship, aircraft or other environment where there may be no other network option.

As is further described below, the User may be provided with an opportunity to renew his or her Certificate 106 with Buffer period 108, which is to say receive a new replacement Certificate 106 with a new Buffer period 108, but this is an action performed without access involving the Second System 116. Moreover, it is an all or nothing Certificate based access with respect to the Second System 116.

As used herein, the term "network access" is understood and appreciated to be the ability of a User 102 to make use of the resources of Second System 116. This may include for example, but is not limited to, the use of applications, access to data, and connectivity to other systems and Users 102 within the Second System 116 as well as other public and private systems.

For at least one embodiment, Certificates 106 are provided by one or more Certificate Authority, of which Certificate Authority 120 is exemplary. As shown, Certificate Authority 120 has a database 122 that includes serial numbers for Certificates 106A, 106B, 106C and 106N assigned respectively to exemplary Users 102A, 102B and 102C. As all of these Certificates 106 are shown to be valid, none of these Certificate serial numbers will exist in a CRL provided by Certificate Authority 120.

There is also a Validation System 112 that is in communication with the Authentication System 110. The Validation System 112 is structured and arranged to receive a request for validation of the Certificate 106 when a User 102 requests access and provides his or her Certificate 106. It is understood and appreciated that each Certificate 106 is static once issued, which is to say that while each Certificate 106 will typically include specific information such as, but not limited to, a serial number, a subject or intended user, the signature algorithm, the issuer, valid from date, valid to date, certificate purpose, public key, and perhaps other data, none of these data elements can be modified without inherently destroying the Certificate 106.

As noted above, for at least one embodiment the Buffer Period 108 of each Certificate 106 is maintained in at least one Buffer Period record 114 such as may be maintained by Second System 116. In other words the Buffer Period 108 is a data element that is maintained separate and apart from the Certificate 106 itself. Moreover, the validation system 112 has a record 114 of Buffer Periods 108 (e.g., the Buffer Period onset date) for each certificate 106. In varying embodiments, this record 114 of Buffer Periods 108 may be a component integrated with the Validation System 112, or a remote database to which the validation System 112 has access rights when and as needed.

Moreover, the record 114 provides correlated records regarding the users 102 known to CBP 100, their Certificates 106 and the Buffer Period 108 associated with each Certificate 106. This record 114 may also record additional data such as, but not limited to, the initial date/time of use of the Certificate 106, the last date/time of use for the Certificate 106, the type of first device associated with the Certificate 106, the MAC address of the First Device 104 that last submitted the request, etc. . . .

For at least one alternative embodiment, one of the typical data fields of the Certificate 106 is used to notate the Buffer Period 108. For example, a Certificate 106 may have an encoded expiration date of 10/19/2016 as expected, but the certificate purpose data field may be used to embed the Buffer Period 108 as 9/19/2016. More specifically, an existing certificate field may be understood and appreciate to encode be the onset of the Buffer Period 108 for the Certificate 106. It is further understood and appreciated that encoding or embedding the Buffer Period 108 within the Certificate 106, such as in the certificate purpose data field does not alter the Certificate 106, rather the ability to recognize the Buffer Period 108 within the Certificate 106 is an advantageous feature of CBP 100.

In varying embodiments, one or more of the elements of CBP 100 may be directly connected to one another, if not integrated with each other, but it is understood and appreciated that in most instances the incorporation of the Internet 124 as a common means of communication and information exchange is within the scope of the present invention.

It is also to be understood and appreciated that the elements of the CBP 100 need not maintain continual communication links 126. In other words, Users 102 may log on or off, and thus establish a link to Authentication System 110 and subsequently Second System 116, the Second System 116 may be on or off line at different times for different reasons, the Authentication System 110 may be on or off line at different times and for different reasons, and even the Validation System 112 and/or the Certificate Authority 120 may be on or off line at different times and for different reasons. However, in general it is understood and appreciated that for expected operation either the elements as shown or suitable substitutions are understood and appreciated to be available for expected operation of CBP 100.

In at least one embodiment, the Validation System 112, the Authentication System 110, and the Certificate Authority 120 are distinct systems, each understood to be a computing device including microprocessors, memory and the like which are adapted by hardware or software to permit data exchange over a network.

For at least one alternative embodiment, the Validation System 112 is an incorporated part or component of the Authentication System 110. For yet another alternative embodiment, the Validation System 112 is an incorporated part or component of the Certificate Authority 120.

In addition, for at least one embodiment, the Validation System 112 as a physical computer system 128 (including at least one microprocessor, memory, I/O device(s), and the like), including a database 130 for maintaining the Buffer Period 108 records 112, is at least in part adapted to provide the Validation System 112 in part by a receiver (e.g., receiver module 132), an evaluator (e.g., evaluator module 134) and an outputer (e.g. output module 136. The receiver module 132 is structured and arranged to receive the certificate 106, or at the very least data sufficient to identify the certificate 106 as an element of the request 118. The receiver module 132 may also receive at least one characteristic 138 of the request 118, such as but not limited to the date and time of the request 118.

This Characteristic 138 may be provided by the Authentication System 110 or the receiver module 132 may self determine the Characteristic 138, such as retrieving the current time and date associated with the request 118. In addition to date and time, for yet other embodiments, the Characteristics 138 may also include data elements such as browser string agent so as to identify the type of web browser being used that may in turn indicate the type of First Device 104.

The evaluator module 134 is structured and arranged to evaluate the Buffer Period 108 associated with the Certificate 106 provided with the request 118. In general, the evaluation of the Buffer Period 108 of the Certificate 106 provided with the request 118 involves review of the Buffer Period 108 record 114. The output module 136 provides the evaluation of the Buffer Period 108 to the Authentication system 110 as to the Certificate 106 being valid or restricted based on the Buffer Period 108.

With respect to CBP 100, it is understood and appreciated that in varying embodiments, the elements, e.g., receiver module 132, the evaluator module 134 and the output module 136 may be provided as software routines, hardware elements and/or combinations thereof. Although shown distinctly for ease of illustration and discussion, in varying embodiments, it is understood and appreciated that one or more of these elements may be combined and/or further subdivided into a number of sub-elements or sub-modules.

With respect to FIG. 1, the elements of the receiver module 132, the evaluator module 134 and the output module 136 are conceptually illustrated in the context of an embodiment for a computer program 140. Such a computer program 140 can be provided upon a non-transitory computer readable media, such as an optical disc 142, or USB drive (not shown), having encoded thereto an embodiment of a program for managing network access with a Certificate 106 having a Buffer Period 108.

The computer executable instructions for computer program 140 are provided to Validation System 112, i.e. computer system 128. During operation of CBP 100 the computer program 140 for managing network access with a Certificate 106 having a Buffer Period 108 may be maintained in active memory for enhanced speed and efficiency. In addition, the computer program 140 for managing network access with a Certificate 106 having a Buffer Period 108 may also be operated within a computer network and may utilize distributed resources.

Moreover, for at least one embodiment, CBP 100 may be summarized as a system for managing certificate based network access based on a Buffer Period 108 for a Certificate 106. CBP 100 includes an Authentication System 110 structured and arranged to receive from a User 102 by way of a first device 104 having at least one processor, a request 118 for certificate based network access, the request 118 including a Certificate 106 having a Buffer Period 108. CBP 100 further includes a Validation System 112 having at least one processor and being in communication with the Authentication System 110 and structured and arranged to receive a request for validation of the Certificate 106, the Validation System 112 evaluating the Certificate 106 having the Buffer Period 108 to a current date by querying a Certificate 106 invalidity source to provide a positive or negative evaluation of the Certificate 106; wherein in response to a positive evaluation of the Buffer Period 108 to the current date the Authentication System 110 permitting Certificate 106 based network access to the user's first device 104 and in response to a negative evaluation of the Buffer Period 108 to the current date the Authentication System 110 blocking at least a portion of network access to the user's first device 104.

Turning now to FIG. 2, provided is a more detailed conceptual view of record 114 recording and tracking the Buffer Periods 108. The organization of this record 114 may take many forms, including but not limited to, a relational database, distributed file, or flat file.

For at least one embodiment, as well as well as ease of illustration and discussion, record 114 is represented at least in part as a table 200. As shown, Table 200 presents a series of entries, specifically at least one for each User 102 known to CBP 100. The nature of the entries associated with each User 102 may vary from User to User depending on a variety of different factors that may be implanted for each User 102.

For example table 200 may have record of different factors, such as but not limited to, the type of User and therefore the type of network access to be granted based on the Certificate 106 having a Buffer Period 108/202 (e.g., different access for a User 102 being an accounts manager then a User 102 being a clerk), the type of User 102 First Device 104 (not shown in FIG. 2, see FIG. 1), etc. For ease of illustration and discussion of the present examples, it will be understood and appreciated that for at least one embodiment, table 200 provides the following records for each User 102 known to CBP 200: Buffer Period 202, Expiration date 204, Device Criteria 206 and at least one optional note field 208.

For the purposes of this present example the current date is understood and appreciated to be Sep. 10, 2015, and each request for access by the exemplary Users 102 will have the Buffer Period 108/204 evaluated with respect to this exemplary current date of Sep. 10, 2015.

For User 102A, Sara, the Buffer Period 202A for Certificate 106A is shown to be 9/19/2016. For User 102B, Kevin, the Buffer Period 202B for Certificate 106B is shown to be 9/5/2015. Both of these Buffer Periods 202A and 202B are clearly shown to be one month before the noted dates of Expiration 204A and 204B for these respective Certificates 106A and 106B. In addition, as will be further discussed below, the indicated onset of the Buffer Period 106B for Kevin, 9/5/2015, is before the current exemplary date of 9/10/2015 such that Kevin's Certificate 106B is now within the Buffer Period, and CBP 100 will evaluate Certificate 106B as invalid even though the actual expiration date 204A has not yet occurred.

For User 102C, Willa, with Certificate 106C the Buffer Period 202C is shown to be 9/2/2015 which of course falls before the exemplary current date of Sep. 10, 2015. The Expiration 204C for Certificate 106C is also noted to be 12/2/2015, indicating a three month Buffer. As will be further discussed below, when the Buffer Period 202C is evaluated against the current exemplary date of 9/10/2015, the determination will be invalid.

For User 102N, Olaf, with Certificate 106N the Buffer Period 202N is shown to be 9/3/2015 which also falls before the exemplary current date of Sep. 10, 2015. The Expiration 204N for Certificate 106N is also noted to be 10/3/2015, indicating a one month Buffer. As will be further discussed below, when the Buffer Period 202N is evaluated against the current exemplary date of 9/10/2015, the determination will be invalid. Of course, intervening Users between 102C and 102N may well exist but have been omitted in the figures for ease of illustration and discussion.

In addition to the Buffer Period 202, for at least one embodiment, CBP 100 can also tie the Certificate 106 not just to a specific User 102, but also one or more permitted First Devices 104 associated with the User 102. For at least one embodiment, such association between a First Device 104 and a Certificate 106 is facilitated at least in part by evaluating a device criteria 206 to a Device Trait 144 (see FIG. 1).

In at least one embodiment each First Device 104 has Device Trait 144 corresponding to at least one predefined Device Criteria 206. In varying embodiments and as noted above in the definitions, the Device Trait 144 is understood and appreciated to be a physical aspect of the device and/or a software aspect of the device. More specifically, the Device Trait 144 is an identifiable element of the device, such as, but not limited to, device ID number, device serial number, device type, manufacturer, software version, software ID, an application, digital ID, MAC address, or other similar element that may be used to identify a class of devices, if not uniquely identify one device from another.

Moreover, in at least one embodiment the Device Trait 144 is intended to be unique to each device, such as a device ID number or serial number. For yet another embodiment, the Device Trait 144 is not specifically unique to only one device, but rather serves to identify a class or type of device, i.e., an iPad® 2, an iPad® 3, or an iPhone® 5. In addition, in general the at least one Device Trait 144 is also something that is not easily duplicated from one device to another.

Further, for at least one embodiment the request 118 may also trigger the detection of at least one Characteristic 138 which may be further used to further verify the User 102 and the validity of the request for secure network access based on the Certificate 106 with Buffer Period 108.

Briefly stated, the Buffer Period 108 permits validation of a Certificate 106 in a distinctly advantageous way aside from just a traditional indication of validity or invalidity based on the presence or absence of the Certificate 106 in a CRL and/or a review of the Certificate 106 itself.

Moreover, it is understood and appreciated that the Authentication System 110 is for at least one embodiment structured and arranged to interpret a Certificate 106 for a basic evaluation of validity—i.e. a review of the embedded serial number, the person or entity it is assigned to, the issuer, the valid from date, the valid to date, and other data inherent to the Certificate 106 itself. However, at least one purpose and advantage of CBP 100 is to permit greater simplicity in the issuing of Certificates 106 for secured network access. As an expired Certificate 106 will not be provided by the user's First Device 104, the advantageous use of the Buffer Period 108 permits CBP 100 to trap a soon to expire Certificate 106 and use the still valid Certificate as an active component of the certificate re-issue process.

For at least one embodiment, the mere possession of a Certificate 106 and ability to provide it with a request 118 is considered sufficient to engage the Validation System 112 for the evaluation of the Certificate 106 based on the Buffer Period 108.

In response to a positive evaluation of the Buffer Period 108/202 by the Validation System 112 validating the Certificate 106 the Authentication System 110 permits access to the User 102. In response to a negative evaluation of the Buffer Period 108/202 by the Validation System 112 the Authentication System 110 blocks access to the User 102 and restricts the Certificate 106.

Moreover it is to be understood and appreciated that the present invention is not just using Certificates 106 to manage secure network access, but is also advantageously providing a new and potentially simplified way to provide new Certificates 106 to Users 102 based on the Users 102 having an existing Certificate 106

More specifically, it is an underlying principle of the present invention as embodied by CBP 100, is that once a Certificate 106 is issued to a User 102, there is and can be a general assumption that the User has vetted him or herself to some degree as a person who can be permitted to use a secured Second System 116, and more specifically the secured certificate based network provided by the Second System 116. Accordingly, gating the use of the Certificate 106 having a Buffer Period 108 of the Certificate 106 permits simplified management of network access, as the existing Certificate 106 maybe used to simplify the re-issue process as a full vetting of the User 102 is not necessarily required.

Moreover, for at least one embodiment, restriction of Certificate 106 initiates an opportunity for the User 102 to renew his or her Certificate 106 before it is revoked or expires. Of course it is understood that the renewal process is actually the issuing of a replacement Certificate 106 having a new fixed expiration date and a new Buffer Period 108.

In other words, the existing Certificate 106 with a Buffer Period 108 provided and trapped as being within the Buffer Period is treated as a first certificate, and upon re-authentication of the User 102, such as by the presentation of Certificate 106 with a Buffer Period 108, the User 102 is provided with a second Certificate 106' having a second lifespan and a second Buffer Period 108'. This second Certificate may then replace the first Certificate 106. In varying embodiments, this replacement may be accomplished with or without User 102 actually being aware of the replacement.

It should be expressly understood that the User 102 need not know that his or her access is based on the Certificate having a Buffer Period 108. He or she as the User may simply be asked if they would like to enjoy continued access to the Second System 116, perhaps for a fee, in exchange for their re-authentication, or perhaps in exchange for the completion of some task such as a survey, yearly work evaluation, re-execution of an employee contract, or such other action as may be desired in varying embodiments.

In other words, for at least one embodiment CBP 100 is structured and arranged to present the option for renewal of the Certificate 106 having a Buffer Period 108. The renewal of the Certificate 106 having a Buffer Period 108 may be a multi part test where the User 102 is provided information that must be returned to CBP 100, or a system or device in communication with CBP 100, or the User 102 may be directed to provide specific information that he or she has previously established. Further, the CBP 100 may request the User 102 to provide a credit card or other form of payment for continued access, re-authentication of the User 102, or may request that the User 102 complete a survey or otherwise participate in some activity or evaluation before a new Certificate 106' having a new Buffer Period 108' is provided.

Moreover, the reissue process for a new Certificate 106 having a Buffer Period 108 may be selected from consisting of, but not limited to, an SMS code for the User 102 for entry upon a specific website within a specific time window, an SMS message to the User 102 requiring a specific reply from the User 102 within a specific time window, an SMS message to the User 102 which requires the User 102 to click on a hyperlink, an email with a verification link, an email with a hyperlink, an email with a code for entry upon a specific website, an email to the User 102, an email to the User 102 that requires a specific reply within a specific time window, a redirection directly, by SMS or by email to a website which requires the User 102 to complete one or more captcha, redirection of the User to a website which requires entry of additional User information, redirection to a website for payment for continued access, redirection to a website for participation in some activity.

With respect to FIG. 1, the reissue of a Certificate 106 having a Buffer Period 108 is achieved in at least one embodiment by directing the User 102 to a third system 146, which may be the same system to which new Users 102 are directed for the initial process of obtaining a Certificate 106 having a Buffer Period 108. For at least one embodiment, the third system 146 as the initial system is structured and arranged with specific details regarding each User 102, such as but not limited to social security number, address, birth date, credit card number, personal challenge questions, and/or such other information as may be appropriate for establishing the credentials of a User 102 and providing a Certificate 106 having a Buffer Period 108. Moreover, for at least one embodiment the Third System 146 is therefore structured and arranged to challenge a User 102 in some way in addition to using the still valid, but restricted Certificate 106 as an element of the re-authentication process prior to issuing a new Certificate 106 having a Buffer Period 108.

With respect to the evaluation of the Buffer Period 108 of the Certificate 106 when presented with a request 118 for access to the Second System 116, it should be understood and appreciated that evaluating the Buffer Period 108 of the Certificate 106 provides near real time adjustment to the apparent validity of the Certificate 106 without the use of a Certificate Revocation List, i.e. a CRL.

Figure 3:
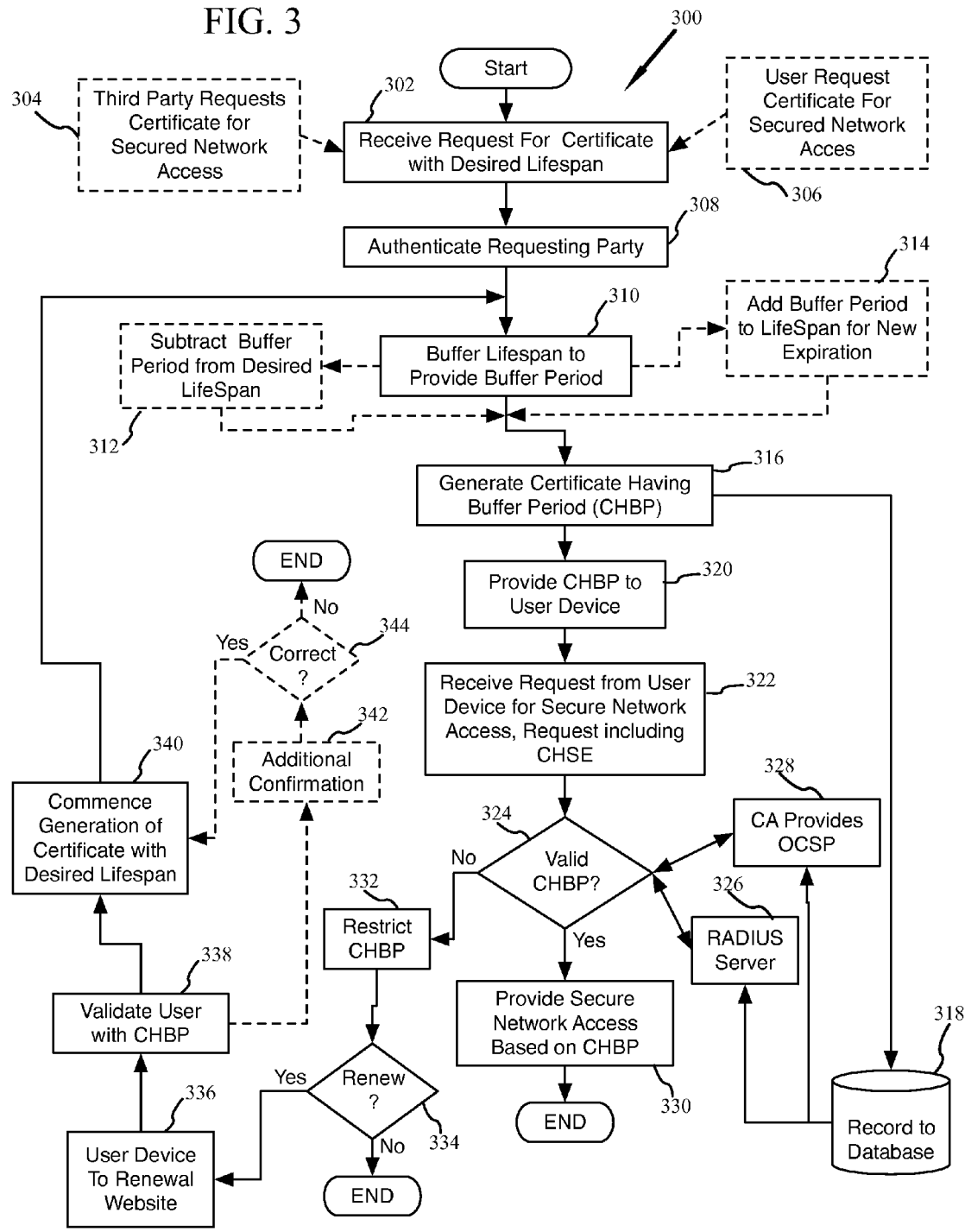
FIG. 3 illustrates a flow diagram for a managing certificate based secure network access based on a certificate having a buffer period prior to expiration in accordance with at least one embodiment.

Having described embodiments for CBP 100 as shown with respect to FIGS. 1 and 2, other embodiments relating to varying methods of managing certificate based secure network access with a Certificate 106 having a Buffer Period 108 will now be discussed with respect to FIG. 3, in connection with FIGS. 2 and 4-7. More specifically, FIGS. 4-7 are variations based on FIG. 1 each separately illustrating a request 118 for access by users 102A-102N and the resulting process leading to approval or denial. It will be appreciated that the described method need not be performed in the order in which it is herein described, but that this description is merely exemplary of one method of managing network access based on a Certificate 106 having a Buffer Period 108.

In general, method 300 commences with a Certificate 106 being generated, block 302. For at least one embodiment, such as a conference, hotel, or other setting where managed network access is desired, one or more Certificates 106 may be requested by a third party, block 304. For yet other instances, the generation of a Certificate 106 may be performed in response to a direct request from a User 102, block 306.

As a Certificate 106 is customarily based on specific information there is typically some level of authentication of the requesting party, block 308. For at least one embodiment, such as where the requesting party is a business entity intending to use the Certificates 106 to provide secure network access for employees of the company, the authentication of the request, block 308 may be little more than administration formality as the issued Certificate 106 is not intended for use in the traditional sense of signing documents, messages, applications and the like, or the verification that another party is who he or she says they are.

For at least one embodiment, the request for a Certificate 106 includes a desired lifespan for the Certificate. For at least one alternative embodiment the requested certificate is understood to have a desired lifespan of a pre-determined length, such as one year.

Method 300 progresses by buffering the desired lifespan so as to provide a Buffer Period prior to the expiration of the Certificate, block 310. For at least one embodiment, the Buffer Period is established by subtracting the Buffer Period from the desired lifespan, optional block 312. For at least one alternative embodiment, the Buffer Period is added to the desired Lifespan, thereby extending the date of expiration, optional block 314.

For at least one embodiment, the Buffer Period is established as shown, commensurate with the process of generating the Certificate 106. This is of course a requirement when, as noted above, the Buffer Period 108 is encoded into the Certificate 106. Of course, for embodiments where the Buffer Period 108 is not encoded into the Certificate 106, the Buffer Period could be established at the time the Certificate is provided to a User 102. However, in such an instance, the Buffer Period 108 would be established by subtracting it from the desired lifespan of the Certificate 106 as the expiration date coded into the Certificate 106 would be immutable.

More commonly, it is anticipated that the buffer period will be determined prior to the generation of the Certificate 106 as has been illustrated by the flow diagram for method 300. Accordingly, upon generation of the Certificate 106 having a Buffer Period 108, block 316, the Buffer Period 108 is then recorded to record 114, block 318. A designated User 102 is then provided with a generated Certificate 106 having a Buffer Period 108, block 320.

In general, whether a given Certificate 106 was generated in response to a Third Party request or a specific request from the User 102 is immaterial. It is also understood and appreciated that the User 102 does not self generate the Certificate 106.

For the present example it is assumed that each exemplary User 102A, 102B, 102C and 102N does in fact have a corresponding Certificate 106A, 106B, 106C and 106N which under normal circumstances would be considered valid. This is to say that each Certificate 106 was properly generated, has not been revoked, and the current exemplary dates of use as discussed herein are beyond the current exemplary date of Sep. 10, 2015.

It is also of course to be understood that each of these Certificate 106A, 106B, 106C and 106N need not have been generated at the same time, or issued to their respective Users 102A, 102B, 102C and 102N at the same time, rather each may have been issued as each User 102 has been added to the CBP 100.

As noted, there are at least two advantageous aspects of the present invention embodied by CBP 100 and method 300. The first is that Users 102 with Certificates 106 having a Buffer Period 108 are permitted Secure Network Access with respect to the Second System 116. This is of course the first element of use of the provided Certificates 106 having a Buffer Period 108. The second is that when the Buffer Period 108 is encountered, the Certificates 106 having a Buffer Period 108 is itself used in the process of re-issuing the User 102 a new Certificates 106' having a Buffer Period 108'.

To help further illustrate these advantageous elements, the present description and accompanying figures have been arranged with four exemplary Users 102A, 102B, 102C and 102N.

For exemplary User 102A, Sara, who's Certificate 106A is AABB, table 200 indicates that her Certificate 106A has a fixed expiration date of 10/19/2016 and the Buffer Period starts 9/19/2016. Her Certificate is valid for use with any First Device 102A.

For exemplary User 102B, Kevin, who's Certificate 106B is BBCC, table 200 indicates that his Certificate 106B has a fixed expiration date of 10/5/2015 and the Buffer Period starts 9/5/2015. His Certificate 106B is also valid only for a First Device 104B identified as Tablet1. In addition, it is noted that Certificate 106B has the Buffer Period 108B embedded within the Certificate 106B.

Moreover, both exemplary Users 102A and 102B are in possession of Certificates that appear clearly valid as the current example date of Sep. 10, 2015 is well before the onset of the Buffer Periods 108A and 108B.

Exemplary User 102C, Willa and 102N, Olaf are slightly different. For these Users, the Buffer Period 108C and 108N is now relevant as the current exemplary date of Sep. 10, 2015 is within the specified Buffer Period.

Possessing a Certificate 106, the users 102 of CBP 100 are set to request access and to receive access, or so each may believe. CBP 100 now receives a request for network access from the User 102, the request 118 providing the Certificate 106 having a Buffer Period 108, block 322. For at least one embodiment, the request 118 may also provide or otherwise trigger the identification of a Device Trait 144, which as discussed below may be incorporated as an element in the evaluation of the request for secure network access upon the second system 116. In addition, for at least one embodiment the request 118 may also provide the Characteristic 138, such as the date and time of the request 118, which may also be incorporated in the evaluation process.

In response to a positive evaluation of the Buffer Period 108 of the Certificate 106 to the current date, decision 324, the Certificate 106 is validated and certificate based network access is provided to First Device 104. Conversely, in response to a negative evaluation of the Buffer Period 108 of the Certificate 106 to the current date, decision 324, the Certificate 106 is restricted and at least a portion of network access is blocked to the First Device 104.

For at least one embodiment, this partial blocking is an entire blocking of any and all access to the secured system, i.e., Second System 116, and is instead a re-direction to a Third System 146 that may be used to issue the User 102 a new Certificate 106 having a Buffer Period 108. For at least one alternative embodiment, this partial blocking of network access permits only limited access to a specific webpage(s) of the secured site that may be used to issue a new Certificate 106 having a Buffer Period 108.

For either option, the action to issue a new Certificate 106 having a Buffer Period 108 may be accomplished by any of the options noted above, such as but not limited to: re-direction to a subscription webpage to pay for a new Certificate 106 having a Buffer Period 108; a re-authentication website to re-authenticate the User; a webpage for survey, questionnaire, or other task completion; or such other webpage as may be desired, such as even a simple question to the User 102, i.e. "Would you like continued access?" However, it is specifically understood and appreciated that the Users current Certificate 106 having a Buffer Period 108 is used at least in part for the re-authentication process in generating a new Certificate 106 having a Buffer Period 108, and may in fact be the sole basis for the re-authentication process in generating a new Certificate 106 having a Buffer Period 108.

Variations in how management of secure network access with a Certificate 106 having a Buffer Period 108 may be more fully appreciated with respect to the following examples.

Example No. 1—Access Request Prior to Buffer Period

Figure 4:
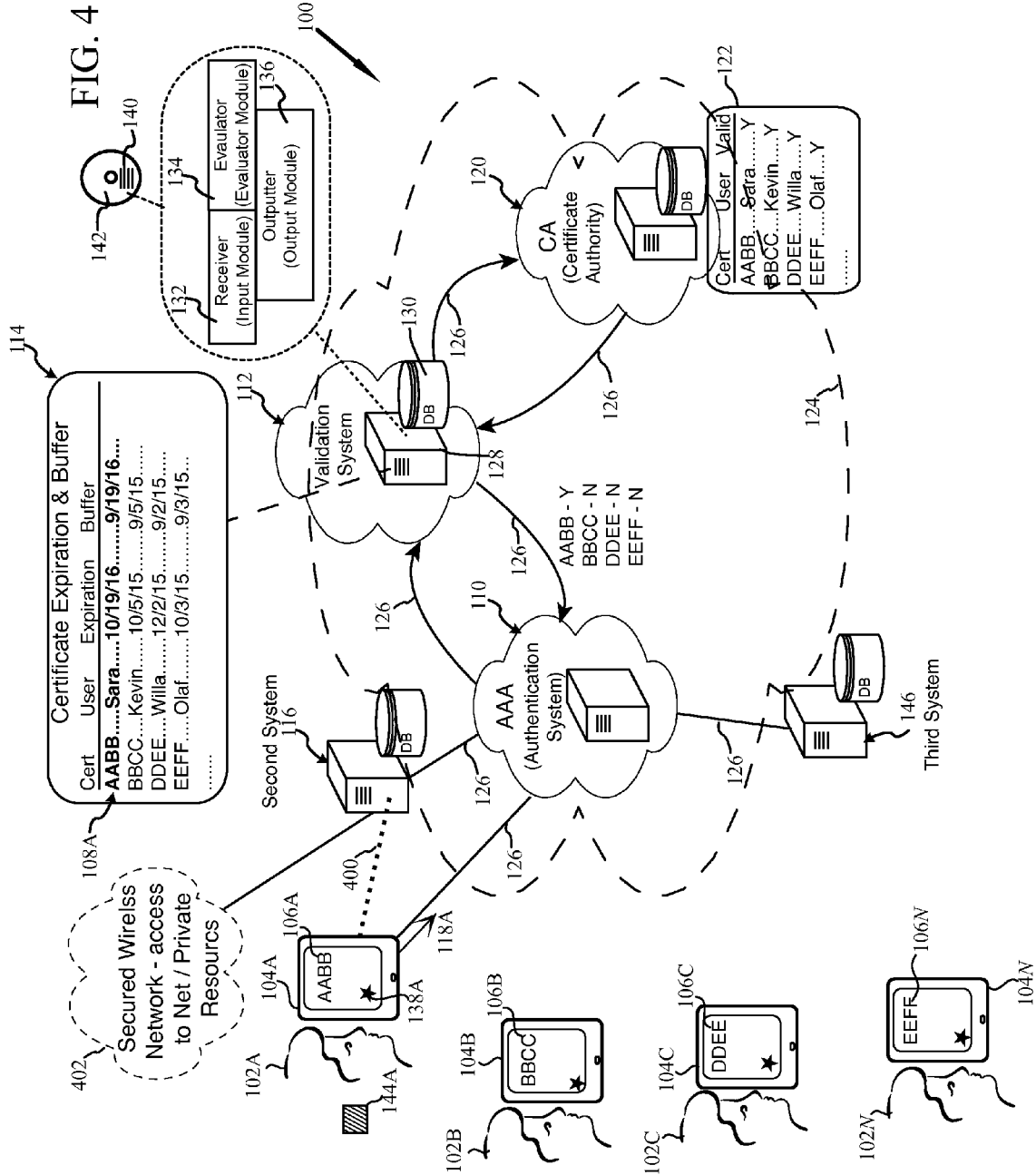
FIG. 4 is a refined version of FIG. 1 further illustrating the managed access based on a certificate having a buffer period prior to expiration for a request by a first user in accordance with at least one embodiment.

Returning to FIG. 3 and method 300, in the exemplary case of User 102A, Sara, as shown in FIG. 4, the exemplary access request 118A, block 322, is being made on Sep. 10, 2015. It is also noted that in Table 200, there is a Device Criteria 206A noted as "ANY", which is to say that User 102A may use the Certificate 106A on any First Device 104A—a laptop, a smart phone, both, etc. . . . . Indeed, for at least one embodiment, User 102A may use Certificate 106A on multiple devices simultaneously.

Method 300 moves to evaluating the Buffer Period 108/202A of the Certificate 106A, decision 324. Although the evaluation may be performed by the Authentication System 110, for ease of illustration and discussion the evaluation is generally performed by the Validation System 112. For at least one embodiment, to evaluate the Buffer Period 108/202A, the Validation System 112 may be, or incorporate a RADIUS server, block 326. Optionally, the Validation System 112 may query an enhanced CA providing an OCSP (Online Certificate Status Protocol), block 328.

In either case, the status of the Buffer Period 108/202A is determined at least in part by consulting the record 114/318. Moreover, to evaluate the Certificate 106A having Buffer Period 108/202A, a certificate invalidity source, such as record 112 and/or table 200 is queried as provided by a database, a CRL, an OCSP, the Validation System 112, an enhanced Certificate Authority 120, or other system.

For User 102A, Sara, as the exemplary current date is Sep. 10, 2015 and therefore before the Buffer Period 108/202A shown as Sep. 19, 2016, the evaluation of the Buffer Period 108/202A is positive, and First Device 104A is provided with secure network access in the form of communications link 400 directly to the Second System 116, based on the Certificate having a Buffer Period 108/202A, block 330.

As a result of this direct and secure communication link 400 to Second System 116, Sara now is permitted access and use of the resources 402, provided by Second System 116. Again, absent a positive evaluation of the Certificate 106A with Buffer Period 108/202A, Sara would not be permitted to access these resources 402 by way of Second System 116.

Example No. 2—Access Request with Buffer Period Embedded

Figure 5:
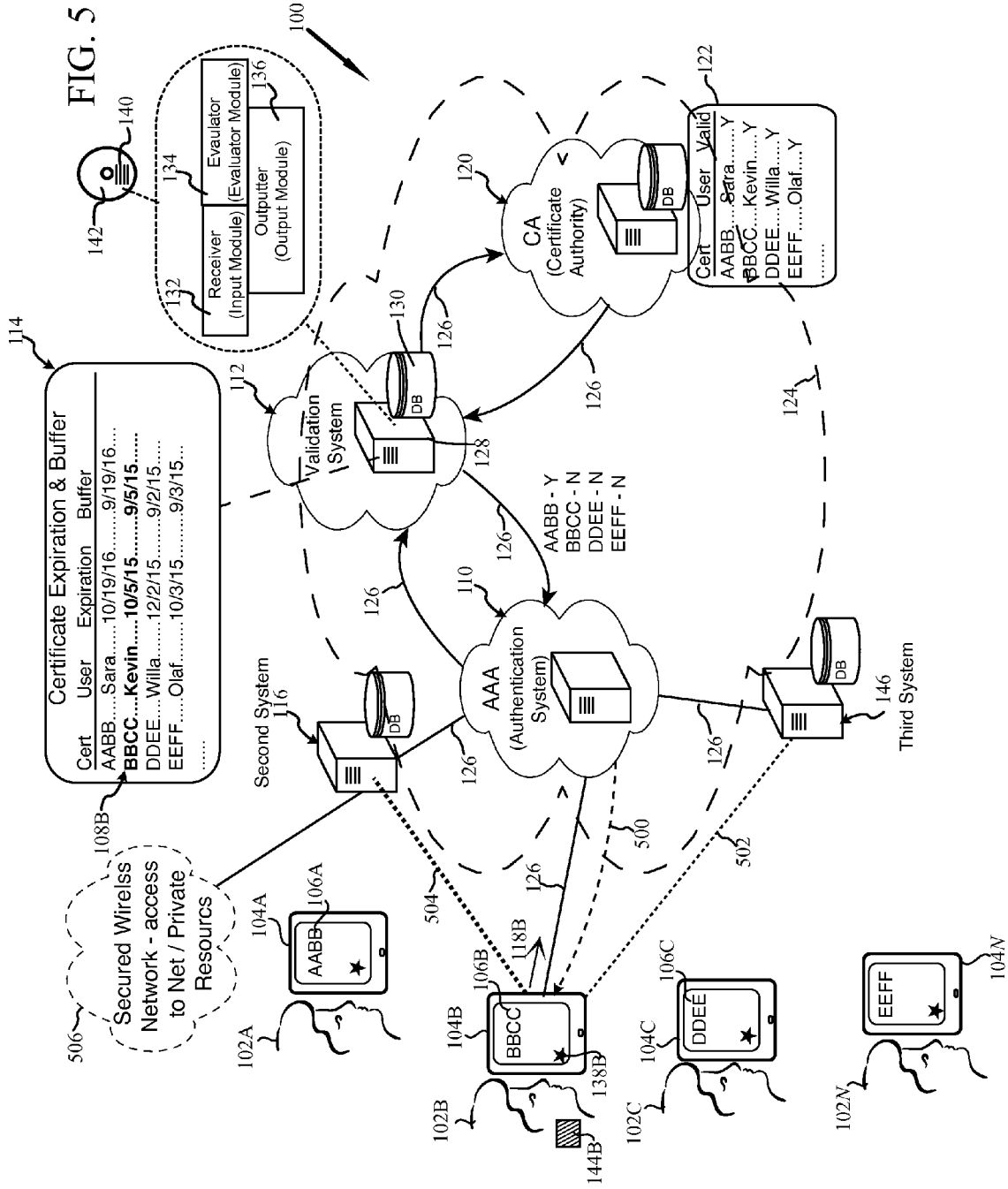
FIG. 5 is a refined version of FIG. 1 further illustrating the managed access based on a certificate having a buffer period prior to expiration for a request by a second user in accordance with at least one embodiment.

In the exemplary case of User 102B, Kevin, as shown in FIG. 5, the flow of method 300 is slightly different. As shown in table 200, the Buffer Period 108/202B is shown to be Sep. 5, 2015 (9/5/2015). It also noted that the Buffer Period 108/202B is embedded within the Certificate 106B.

Moreover, for at least one embodiment the Certificate 106B is an x.509 certificate or other certificate which includes data fields that are intended to be populated with useful information such as, but not limited to, a serial number, a subject or intended user, the signature algorithm, the issuer, valid from date, valid to date, certificate purpose, public key, and perhaps other data. For this example of User 102B, the one of these data fields, such as the "certificate purpose" data field has been populated with the Buffer Period 108/202B date of 9/5/2015.

As the Buffer Period 108/202B is embedded within the Certificate 106, the apparent validity of Certificate 106B may be determined directly from the Certificate 106B by CBP 100 without consulting a RADIUS server 326, an OCSP 328, or a database 114/318. It should be noted that a system other than CBP 100 would not determine Certificate 106B as invalid because the Buffer Period 108/202B as recorded within the notation data fields does not alter the actual encoded expiration period 204B. Moreover, use of the provided data fields for notations within the Certificate 106B to record the Buffer Period 108/202B within the Certificate 106B does not alter use or function of the Certificate when and if presented outside of CBP 100, but does permit an advantageous ability to CBP 100 to re-provision Certificates to Users 102 without requiring an underlying change to the Certificates 106.

Moreover, upon receipt of the request 118B from User 102B, block 322, method 300 moves to evaluate the Buffer Period 108/202B, decision 324. For at least one embodiment, CBP 100, and more specifically the Validation System 112 is structured and arranged to review the Certificate 106B as provided with request 118B to check for an embedded Buffer Period 108/202B.

For this example, an embedded Buffer Period 108/202B is detected and recognized to be 9/5/2015. As an optional additional element of the verification and evaluation process, table 200 may be consulted, but for at least one embodiment this additional consultation step is not performed.

In this case as the exemplary present date is Sep. 10, 2015 and the Buffer Period 108/202B is appreciated to be 9/5/2015, it is clear that Certificate 106B has been submitted within the Buffer Period 108/202B. As such the evaluation is negative and the Certificate 106B is restricted, block 332.

In other words, CBP 100 de-activates Certificate 106B, which is to say that it has not been revoked and its status with the Certificate Authority 120 is unchanged. However, within CBP 100 the Certificate 106B is in a state of suspension.

With respect to exemplary User 102B, it is also worth noting that table 200 notes that the Device Criteria 206B is for "Tablet1." If First Device 104B provides a Device Trait 144B indicating that it is a laptop or smart phone but not Tablet1, the Buffer Period 108/202B may be evaluated as invalid based on the request 118 having been provided by an unauthorized first device 104.

Method 300 moves then to determining if a new Certificate 106 having a Buffer Period 108 should be provided to User 102B, decision 334. For the purposes of the present example, it is assumed that issuing a new Certificate 106 having a Buffer Period 108 is desired.

Accordingly, the First Device 104B is directed to a renewal Website, block 336, such as may be provided by Third System 146. In varying embodiment, this redirection may be automatic, such as by CBP 100 redirecting the User Device 102B to the Third System 146 by communications link 400, or achieved by CBP 100 sending a text message 500 to First Device 104B that includes a re-direction link to Third System 146.

For at least one embodiment, the when User 102B establishes his connection with the renewal website, block 336, his current Certificate 106B having a Buffer Period 108/202B, though restricted for network access, is still valid and presented so as to validate User 102B, block 338. For at least one embodiment, no further verification is necessary, and method 300 progresses by commencing the generation of a new Certificate 106' having a Buffer Period 108', block 340.

For at least one alternative embodiment, an optional additional confirmation is desired, block 342. For the present example where User 102B is understood to be a contractor, the use of a text message may be desirable as the text message affords CBP 100 the opportunity to provide User 102B with an authorization code, i.e. 27088, that may be in turn provided by First Device 102B to the Third System 146 to initiate the generation of a new Certificate 106 having a Buffer Period 108.

Receiving the text message 500, User 102B accesses the Third System 146 via communications link 502, such as by a web browser and provides the received code, i.e., code 27088, block 342. Of course, in absence of a text message, User 102B may provide other identification upon connection to Third System 146 to achieve generation of a new Certificate 106 having a Buffer Period 108. If User 102B is successful in supplying the additional confirmation, decision 344, method 300 progresses by commencing the generation of a new Certificate 106' having a Buffer Period 108', block 340.

Accordingly method 300 returns to establishing a Buffer with respect to the lifespan of the new Certificate 10, block 310. For this specific example, the desired lifespan is 1 year, and the Buffer Period is added to this term, block 314, such that new generation of a new Certificate 106B' having a Buffer Period 108' has an actual expiration date established 13 months out; 12 months for the desired lifespan and 1 month for the Buffer Period.

When User 102B is then provided with the new generation of a new Certificate 106B' having a new Buffer Period 108 his request for network access will be validated positively, decision 324 and secure communication link 504 is established to Second System 116 such that Kevin is permitted is permitted access and use of the resources 506, provided by Second System 116. Again, absent a positive evaluation of the Certificate 106B having Buffer Period 108/202B, Kevin would not be permitted to access these resources 506 by way of Second System 116.

Example No. 3—Buffer Period Not Embedded

Figure 6:
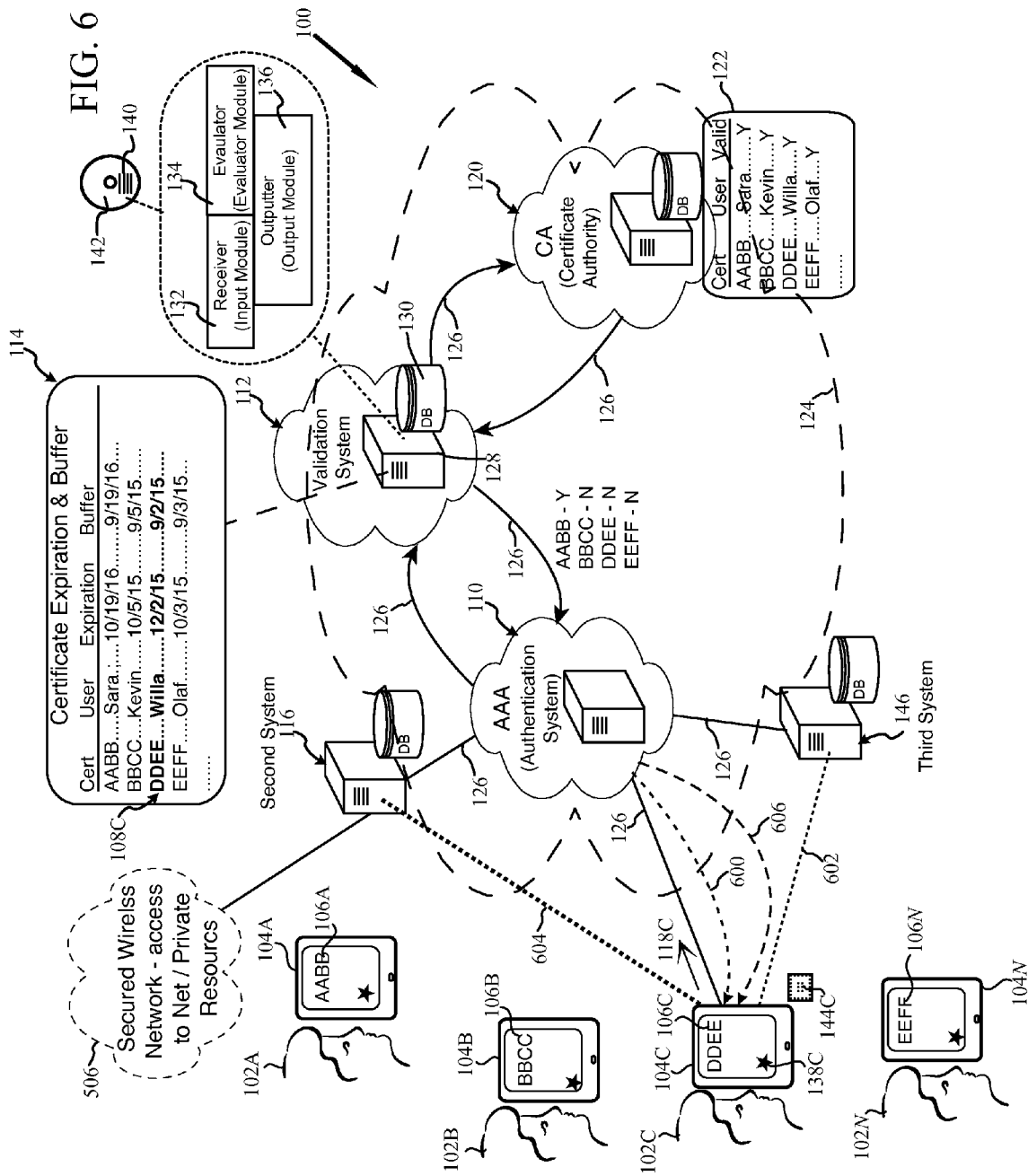
FIG. 6 is a refined version of FIG. 1 further illustrating the managed access based on a certificate having a buffer period prior to expiration for a request by a third user in accordance with at least one embodiment.

User 102C, Willa, having Certificate 106C as DDEE, presents a slightly different example for how CBP 100 may be implemented as shown in FIG. 6. For User 102C, the actual expiration date 204C of Certificate 106C is shown in table 200 to be 12/2/2015, yet the Buffer Period 202C is 9/2/2015. Moreover, the Buffer Period 108 may be established in different situations for different terms, i.e. one month for one User 102A and three months for User 102C.

As Certificate 106C is shown in table 200 to have a Buffer Period 202C of 9/2/2015. Accordingly, as shown in FIG. 6 she will be directed to third system 146 to commence the process of receiving a new a new Certificate 106 having a Buffer Period 108. In this case, this redirection is by hyper link 600, that redirects User 102C to Third System 146 by communications link 602. Alternatively, the redirection may be accomplished with an email 606, that is sent to Willa and which when opened provides the address to establish hyperlink 600.

When Willa has been directed to the renewal website, block 336, and passively validated (such as by her existing Certificate 106C having Buffer Period 108/202C, block 338), or actively validated (such as by her existing Certificate 106 and an additional confirmation, block 342) a new Certificate 106 having a Buffer Period 108 is generated and provided to her. Willa is then provided with secure communication link 606 to Second System 116.

As a result of this direct and secure communication link 664 to Second System 114, Willa now is permitted access and use of the resources 608, provided by Second System 116. Again, absent a positive evaluation of the Certificate 106C having Buffer Period 108/202C, Willa would not be permitted to access these resources 606 by way of Second System 116.

Moreover, embodiments of CBP 100 and method 300 permit highly advantageous control of Certificates 106 and how they are used. An authorized User 102 may certainly receive a Certificate 106 having a Buffer Period 108 for access that is viable for his or her First Device 104 during a project, duration of stay or, contract for employment, or paid term of access. In varying embodiments the Certificate 106 may also be limited to specific devices, or open ended to any devices.

With respect to the above examples, it should also be noted that if the decision to Renew is No, decision 334, or if the re-validation for whatever reason, decisions 338 and/or 344, method 300 ends. In either case the Certificate 106 having a Buffer Period 108 has been restricted, but it has not been revoked. Revocation of the Certificate may be implanted in some embodiments, but it is not necessary in all. For example, just because a User opted not to renew his or her Certificate 106 having a Buffer Period 108 in one instance does not suggest that they may not wish to renew at some further point prior to the actual expiration date of the Certificate 106. Because the Certificate 106 having a Buffer Period 108 has not been revoked, it is still valid and therefore may be used to re-authenticate the user and simplify the generation of a new Certificate 106 having a new Buffer Period 108 at any future point prior to the actual expiration date.

Figure 7:
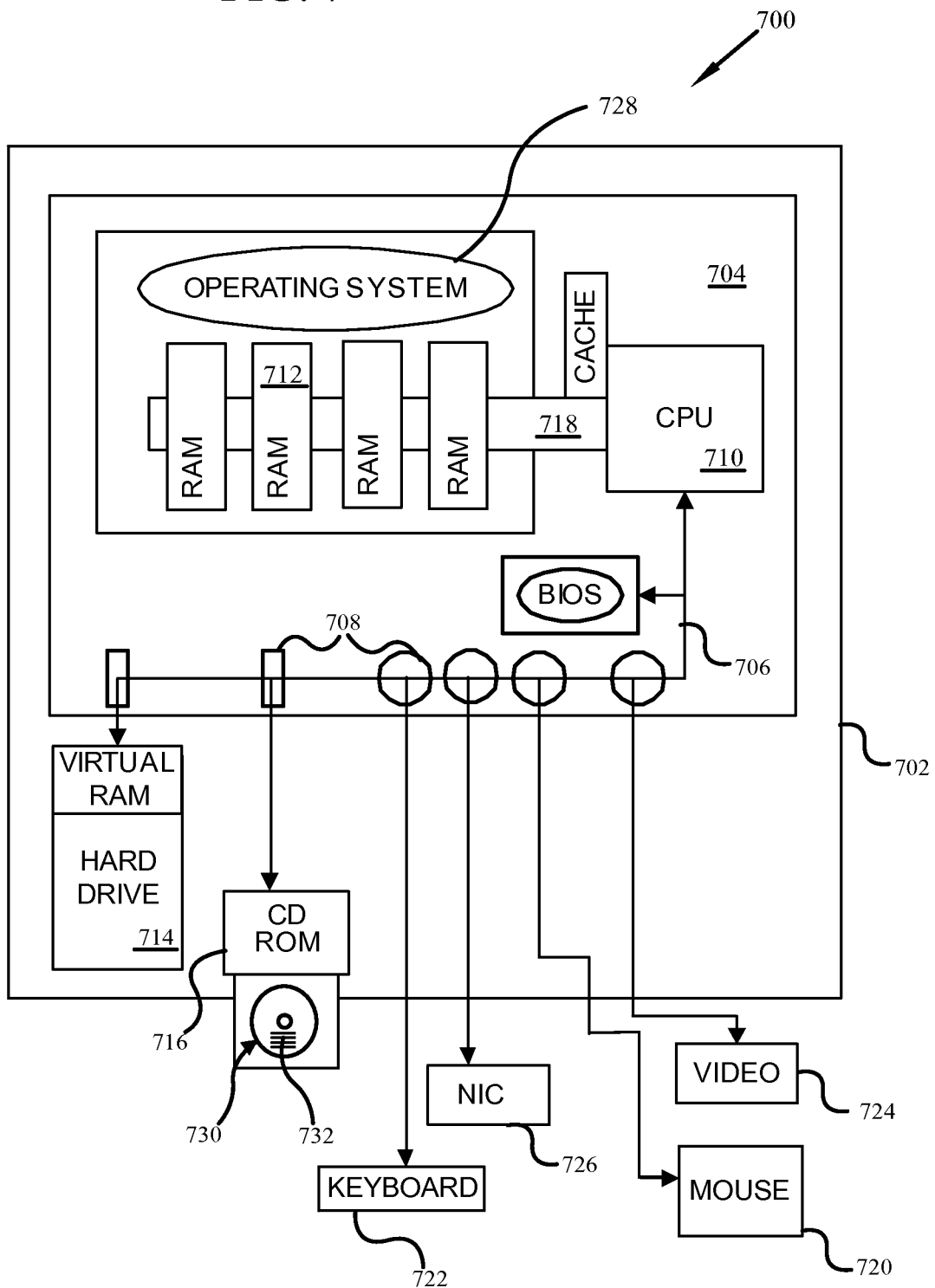
FIG. 7 is a high level block diagram of a computer system in accordance with at least one embodiment.

With respect to the above description of the system and method for managing network access with a Certificate 106 having a Buffer Period 108, it is understood and appreciated that the method may be rendered in a variety of different forms of code and instruction as may be used for different computer systems and environments. To expand upon the initial suggestion of the First Device 104, Authentication System 110, Validation System 112, Second System 116, Certificate Authority 120, and Third System 146 being computer systems adapted to their specific roles, FIG. 7 is a high level block diagram of an exemplary computer system 700 such as may be provided for one or more of the elements comprising the First Device 104, Authentication System 110, Validation System 112, Second System 116, Certificate Authority 120, and Third System 146 whether provided as distinct individual systems or integrated together in one or more computer systems.

Computer system 700 has a case 702, enclosing a main board 704. The main board 704 has a system bus 706, connection ports 708, a processing unit, such as Central Processing Unit (CPU) 710 with at least one microprocessor (not shown) and a memory storage device, such as main memory 712, hard drive 714 and CD/DVD ROM drive 716.

Memory bus 718 couples main memory 712 to the CPU 710. A system bus 706 couples the hard disc drive 714, CD/DVD ROM drive 716 and connection ports 708 to the CPU 710. Multiple input devices may be provided, such as, for example, a mouse 720 and keyboard 722. Multiple output devices may also be provided, such as, for example, a video monitor 724 and a printer (not shown). As computer system 700 is intended to be interconnected with other computer systems in the CBP 100 a combined input/output device such as at least one network interface card, or NIC 726 is also provided.

Computer system 700 may be a commercially available system, such as a desktop workstation unit provided by IBM, Dell Computers, Gateway, Apple, or other computer system provider. Computer system 700 may also be a networked computer system, wherein memory storage components such as hard drive 714, additional CPUs 710 and output devices such as printers are provided by physically separate computer systems commonly connected together in the network.

Those skilled in the art will understand and appreciate that the physical composition of components and component interconnections are comprised by the computer system 700, and select a computer system 700 suitable for one or more of the computer systems incorporated in the formation and operation of CBP 100.

When computer system 700 is activated, preferably an operating system 728 will load into main memory 712 as part of the boot strap startup sequence and ready the computer system 700 for operation. At the simplest level, and in the most general sense, the tasks of an operating system fall into specific categories, such as, process management, device management (including application and User interface management) and memory management, for example. The form of the computer-readable medium 730 and language of the program 732 are understood to be appropriate for and functionally cooperate with the computer system 700.

Moreover, variations of computer system 700 may be adapted to provide the physical elements of one or more components comprising each First Device 104, Authentication System 110, Validation System 112, Second System 116, Certificate Authority 120, and Third System 146 the switches, routers and such other components as may be desired and appropriate for the methods and systems of managing network access based on a Certificate 106 having a Buffer Period 108.

Changes may be made in the above methods, systems and structures without departing from the scope hereof. It should thus be noted that the matter contained in the above description and/or shown in the accompanying drawings should be interpreted as illustrative and not in a limiting sense. Indeed many other embodiments are feasible and possible, as will be evident to one of ordinary skill in the art. The claims that follow are not limited by or to the embodiments discussed herein, but are limited solely by their terms and the Doctrine of Equivalents.

What is claimed is:

1. A method of managing Certificate based secure network access based on a Certificate having a buffer period prior to expiration comprising:
   receiving a request to generate a certificate for a user device, the certificate for certificate based OSI Layer 2-3 network access on a secured wireless network, distinct from the user device, the certificate to have a desired lifespan;
   buffering the desired lifespan to provide a buffer period before expiration of the certificate, the buffer period less than the lifespan;
   generating, by a Certificate generation system having a processor, the Certificate for Certificate based OSI Layer 2-3 network access, the certificate having an expiration incorporating the lifespan and the buffer period;
   providing the Certificate to a User Device having a processor, the User Device distinct from the Certificate generation system;
   receiving by an authentication device, a request for wireless network access upon the secured wireless network from the user device, the request providing an unexpired Certificate having the buffer period;
   evaluating the buffer period of the Certificate to a current date;
      in response to a positive evaluation of the buffer period to the current date, validating the Certificate provided in the request and permitting certificate based OSI Layer 2-3 network access to the user device; and
      in response to a negative evaluation of the buffer period to the current date, restricting the Certificate provided with the request and blocking at least a portion of network access to the user device, a user action required to re-establish full network access.

2. The method of claim 1, wherein buffer period is added to the desired lifespan.

3. The method of claim 1, wherein buffer period is subtracted from the desired lifespan.

4. The method of claim 1, wherein buffer period is encoded within the Certificate.

5. The method of claim 1, wherein buffer period for the Certificate is determined from a database.

6. The method of claim 1, wherein a positive evaluation of the buffer period includes evaluating the buffer period as greater than the current date.

7. The method of claim 1, wherein blocking at least a portion of the network access includes directing the User Device to a re-enrolment site to request a new Certificate.

8. The method of claim 1, wherein blocking at least a portion of the network access includes directing the User Device to access a renewal webpage to re-authenticate the User and issue a second certificate having a second Lifespan with a second buffer period.

9. The method of claim 1, wherein upon the negative evaluation of the buffer period to the current date, the Certificate is treated as invalid.

10. The method of claim 1, wherein evaluating the buffer period of the Certificate includes querying a Certificate validity source.

11. The method of claim 10, wherein the certificate validity source is selected from the group consisting of: an Online Certificate Status Protocol ("OCSP"), a Certificate Revocation List ("CRL"), a database.

12. The method of claim 1, wherein validity of the Certificate having the buffer period is changed by reporting via a Certificate Authority in communication with the authentication device an invalid state for the Certificate upon the current date being within the buffer period.

13. The method of claim 1, wherein validity of the Certificate having the buffer period is changed by reporting via a Remote Authentication Dial-In User Service ("RADIUS") Server in communication with the authentication device an invalid state for the Certificate upon the current date being within the buffer period.

14. The method of claim 1, wherein restricting the Certificate initiates a process for the user to re-authenticate him or herself prior to the Lifespan of the certificate expiring.

15. The method of claim 14, the Certificate is a first Certificate and upon re-authentication the user is provided with a second certificate having a second lifespan with a second buffer period, the second certificate provided before the expiration of the lifespan of the first Certificate.

16. A system for managing Certificate based secure network access based on a Certificate having a buffer period prior to expiration comprising:
an authentication hardware system structured and arranged to receive from a User by way of a first device having at least one processor, a request for certificate based OSI Layer 2-3 network access, the request including an unexpired Certificate having a lifespan incorporating a buffer period, the buffer period less than the lifespan, the Certificate having an expiration incorporating the lifespan and the buffer period;
a validation hardware system having at least one processor and being in communication with the authentication hardware system and structured and arranged to receive a request for validation of the Certificate, the validation hardware system evaluating the Certificate having the lifespan incorporating the buffer period to a current date to provide a positive or negative evaluation of the Certificate;
wherein in response to a positive evaluation of the buffer period to the current date, validating the Certificate provided in the request and permitting certificate based OSI Layer 2-3 network access to the user device and in response to a negative evaluation of the buffer period to the current date, restricting the Certificate provided with the request and blocking at least a portion of network access to the user device, a user action required to re-establish full network access.

17. The system of claim 16, further including:
a receiver hardware system having at least one processor and structured and arranged to receive a request to generate a certificate for a user device, the certificate for certificate based OSI Layer 2-3 network access on a secured wireless network, distinct from the user device, the certificate to have a desired lifespan, the receiver system further buffering the desired lifespan to provide a buffer period before expiration of the certificate; and
a certificate generation hardware system having at least one processor, structured and arranged to generate the Certificate for Certificate based OSI Layer 2-3 network access.

18. The system of claim 16, wherein the validation hardware system is a component of the authentication hardware system.

19. The system of claim 16, wherein the validation hardware system is a component of a Certificate authority responsible for the Certificate.

20. The system of claim 16, wherein the validation hardware system is a disposed between the authentication system and a Certificate authority responsible for the Certificate.

21. The system of claim 16, wherein buffer period is added to the desired lifespan.

22. The system of claim 16, wherein buffer period is subtracted from the desired lifespan.

23. The system of claim 16, wherein buffer period is encoded within the Certificate.

24. The system of claim 16, wherein buffer period for the Certificate is determined from a database.

25. The system of claim 16, wherein a positive evaluation of the buffer period includes evaluating the buffer period as greater than the current date.

26. The system of claim 16, wherein blocking at least a portion of the network access includes directing the User Device to a re-enrolment site to request a new Certificate.

27. The system of claim 16, wherein blocking at least a portion of the network access includes directing the User Device to access a renewal webpage to re-authenticate the User and issue a second certificate having a second Lifespan with a second buffer period.

28. The system of claim 16, wherein upon the negative evaluation of the buffer period to the current date, the Certificate is treated as invalid.

29. The system of claim 16, wherein evaluating the buffer period of the Certificate includes determining the buffer period directly from the Certificate.

30. The system of claim 16, wherein evaluating the buffer period of the Certificate includes querying a Certificate validity source.

31. The system of claim 30, wherein the certificate validity source is selected from the group consisting of: an Online Certificate Status Protocol ("OCSP"), a Certificate Revocation List ("CRL"), a database.

32. The system of claim 16, wherein validity of the Certificate having the buffer period is changed by reporting via a Certificate Authority in communication with the authentication device an invalid state for the Certificate upon the current date being within the buffer period.

33. The system of claim 16, wherein validity of the Certificate having the buffer period is changed by reporting via a Remote Authentication Dial-In User Service ("RA- DIUS") Server in communication with the authentication device an invalid state for the Certificate upon the current date being within the buffer period.

34. The system of claim 16, wherein restricting the Certificate initiates a process for the user to re-authenticate him or herself prior to the Lifespan of the certificate expiring.

35. The system of claim 34, the Certificate is a first Certificate and upon re-authentication the user is provided with a second certificate having a second lifespan with a second buffer period, the second certificate provided before the expiration of the lifespan of the first Certificate.

36. A non-transitory machine-readable medium on which is stored a computer program for managing Certificate based secure network access based on a Certificate having a buffer period prior to expiration provided to a user, the computer program comprising instructions which when executed by a computer system having at least one processor performs the steps of:
receiving a request to generate a certificate for a user device, the certificate for certificate based OSI Layer 2-3 network access on a secured wireless network, distinct from the user device, the certificate to have a desired lifespan;
buffering the desired lifespan to provide a buffer period before expiration of the certificate, the buffer period less than the lifespan;
generating, by a Certificate generation system having a processor, the Certificate for Certificate based OSI Layer 2-3 network access, the certificate having an expiration incorporating the lifespan and the buffer period;
providing the Certificate to a User Device having a processor, the User Device distinct from the Certificate generation system;
receiving by an authentication device, a request for wireless network access upon the secured wireless network from the user device, the request providing an unexpired Certificate having the buffer period;
evaluating the buffer period of the Certificate to a current date;
in response to a positive evaluation of the buffer period to the current date, validating the Certificate provided in the request and permitting certificate based OSI Layer 2-3 network access to the user device; and
in response to a negative evaluation of the buffer period to the current date, restricting the Certificate provided with the request and blocking at least a portion of network access to the user device, a user action required to re-establish full network access.

37. The non-transitory machine-readable medium of claim 36, wherein a positive evaluation of the buffer period includes evaluating the buffer period as greater than the current date.

38. The non-transitory machine-readable medium of claim 36, wherein buffer period is added to the desired lifespan.

39. The non-transitory machine-readable medium of claim 36, wherein buffer period is subtracted from the desired lifespan.

40. The non-transitory machine-readable medium of claim 36, wherein buffer period is encoded within the Certificate.

41. The non-transitory machine-readable medium of claim 36, wherein buffer period for the Certificate is determined from a database.

42. The non-transitory machine-readable medium of claim 36, wherein a positive evaluation of the buffer period includes evaluating the buffer period as greater than the current date.

43. The non-transitory machine-readable medium of claim 36, wherein blocking at least a portion of the network access includes directing the User Device to a re-enrolment site to request a new Certificate.

44. The non-transitory machine-readable medium of claim 36, wherein blocking at least a portion of the network access includes directing the User Device to access a renewal webpage to re-authenticate the User and issue a second certificate having a second Lifespan with a second buffer period.

45. The non-transitory machine-readable medium of claim 36, wherein upon the negative evaluation of the buffer period to the current date, the Certificate is treated as invalid.

46. The non-transitory machine-readable medium of claim 36, wherein evaluating the buffer period of the Certificate includes querying a Certificate validity source.

47. The non-transitory machine-readable medium of claim 46, wherein the certificate validity source is selected from the group consisting of: an Online Certificate Status Protocol ("OCSP"), a Certificate Revocation List ("CRL"), a database.

48. The non-transitory machine-readable medium of claim 36, wherein validity of the Certificate having the buffer period is changed by reporting via a Certificate Authority in communication with the authentication device an invalid state for the Certificate upon the current date being within the buffer period.

49. The non-transitory machine-readable medium of claim 36, wherein validity of the Certificate having the buffer period is changed by reporting via a Remote Authentication Dial-In User Service ("RADIUS") Server in communication with the authentication device an invalid state for the Certificate upon the current date being within the buffer period.

50. The non-transitory machine-readable medium of claim 36, wherein restricting the Certificate initiates a process for the user to re-authenticate him or herself prior to the Lifespan of the certificate expiring.

51. The non-transitory machine-readable medium of claim 50, the Certificate is a first Certificate and upon re-authentication the user is provided with a second certificate having a second lifespan with a second buffer period, the second certificate provided before the expiration of the lifespan of the first Certificate.

52. A non-transitory machine-readable medium on which is stored a computer program comprising instructions to adapt a computer system having at least one processor to provide Certificate based secure network access based on a Certificate having a buffer period prior to expiration previously provided to a user comprising:
a receiver module operatively associated with an input device for receiving a request for certificate based OSI Layer 2-3 network access from a user by way of a first device having at least one processor, the request including an unexpired Certificate having a lifespan incorporating a buffer period previously provided to the user device by a certificate generation system other than the user device the buffer period less than the lifespan, the Certificate having an expiration incorporating the lifespan and the buffer period;

an evaluation module for evaluating the Certificate having the lifespan incorporating the buffer period to a current date to provide a positive or negative evaluation of the Certificate;
  in response to a positive evaluation of the buffer period to the current date, validating the Certificate provided in the request and permitting certificate based OSI Layer 2-3 network access to the user device; and
  in response to a negative evaluation of the buffer period to the current date, restricting the Certificate provided with the request and blocking at least a portion of network access to the user device, a user action required to re-establish full network access.

53. The non-transitory machine-readable medium of claim 52, wherein a positive evaluation of the buffer period includes evaluating the buffer period as greater than the current date.

54. The non-transitory machine-readable medium of claim 52, wherein buffer period is added to the desired lifespan.

55. The non-transitory machine-readable medium of claim 52, wherein buffer period is subtracted from the desired lifespan.

56. The non-transitory machine-readable medium of claim 52, wherein buffer period is encoded within the Certificate.

57. The non-transitory machine-readable medium of claim 52, wherein buffer period for the Certificate is determined from a database.

58. The non-transitory machine-readable medium of claim 52, wherein a positive evaluation of the buffer period includes evaluating the buffer period as greater than the current date.

59. The non-transitory machine-readable medium of claim 52, wherein blocking at least a portion of the network access includes directing the User Device to a re-enrolment site to request a new Certificate.

60. The non-transitory machine-readable medium of claim 52, wherein blocking at least a portion of the network access includes directing the User Device to access a renewal webpage to re-authenticate the User and issue a second certificate having a second Lifespan with a second buffer period.

61. The non-transitory machine-readable medium of claim 52, wherein upon the negative evaluation of the buffer period to the current date, the Certificate is treated as invalid.

62. The non-transitory machine-readable medium of claim 52, wherein evaluating the buffer period of the Certificate includes querying a Certificate validity source.

63. The non-transitory machine-readable medium of claim 62, wherein the certificate validity source is selected from the group consisting of: an Online Certificate Status Protocol ("OCSP"), a Certificate Revocation List ("CRL"), a database.

64. The non-transitory machine-readable medium of claim 52, wherein validity of the Certificate having the buffer period is changed by reporting via a Certificate Authority in communication with the authentication device an invalid state for the Certificate upon the current date being within the buffer period.

65. The non-transitory machine-readable medium of claim 52, wherein validity of the Certificate having the buffer period is changed by reporting via a Remote Authentication Dial-In User Service ("RADIUS") Server in communication with the authentication device an invalid state for the Certificate upon the current date being within the buffer period.

66. The non-transitory machine-readable medium of claim 52, wherein restricting the Certificate initiates a process for the user to re-authenticate him or herself prior to the Lifespan of the certificate expiring.

* * * * *